United States Patent [19]
Leib et al.

[11] Patent Number: 4,929,056
[45] Date of Patent: May 29, 1990

[54] APPARATUS FOR OPENING AND HOLDING A FRAME AND A METHOD OF MOUNTING AN OPTICAL ELEMENT IN A FRAME

[75] Inventors: Kenneth G. Leib, Wantagh; Edward V. Sullivan, Huntington Station, both of N.Y.

[73] Assignee: Grumman Aerospace Corporation

[21] Appl. No.: 241,593

[22] Filed: Sep. 8, 1988

[51] Int. Cl.⁵ ............................................. G02B 27/00
[52] U.S. Cl. ..................... 350/321; 350/252; 350/320; 350/257; 24/458; 248/231.2
[58] Field of Search ............... 350/252, 256, 257, 318, 350/320, 321; 248/575, 312, 419, 423, 231.1, 231.2; 24/484, 458

[56] References Cited

U.S. PATENT DOCUMENTS

| 275,316 | 4/1883 | Wright . | |
| 587,241 | 7/1897 | Seidel . | |
| 662,736 | 11/1900 | Prahar . | |
| 685,695 | 10/1901 | Seymoure . | |
| 1,262,528 | 4/1918 | Lofland | 350/256 |
| 1,291,375 | 1/1919 | Berg . | |
| 1,775,180 | 9/1930 | Worshing . | |
| 1,987,058 | 1/1935 | Fuller | 350/318 |
| 2,089,236 | 8/1937 | Welsh | 24/484 |
| 2,208,642 | 7/1940 | Neuwirth | 350/256 |
| 2,268,430 | 12/1941 | Silbernagel . | |
| 2,388,431 | 11/1945 | Neiman . | |
| 3,070,389 | 12/1962 | Baur et al. | 350/257 |
| 3,678,705 | 7/1972 | Korwin . | |
| 3,871,752 | 3/1975 | Habinger . | |
| 4,215,890 | 8/1980 | Savage . | |
| 4,302,076 | 11/1981 | Hashimoto | 350/252 |
| 4,319,385 | 3/1982 | Marchou | 24/284 |

FOREIGN PATENT DOCUMENTS 2907554 8/1980 Fed. Rep. of Germany .
2907555 8/1980 Fed. Rep. of Germany .

Primary Examiner—Bruce Y. Arnold
Assistant Examiner—Loha Ben

[57] ABSTRACT

Apparatus for opening and holding a frame of the type that is flexible between open and closed positions and that forms an opening. The apparatus comprises a mounting member defining a seating surface adapted to seat against the frame; and an expansion member connected to the mounting member, and adapted to extend into the opening of the frame to force the frame into the open position, and to hold the frame in the open position when the frame is seated on the mounting member. In operation, the frame is placed on the mounting member, the expansion member is forced through the opening in the frame to spread the frame from its closed position to its open position, and an optical plate is placed in or removed from the frame. Once this is done, the expansion member is withdrawn from the opening in the frame to return the frame to its closed position, and the frame is removed from the mounting member.

21 Claims, 3 Drawing Sheets

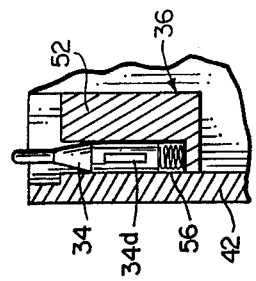
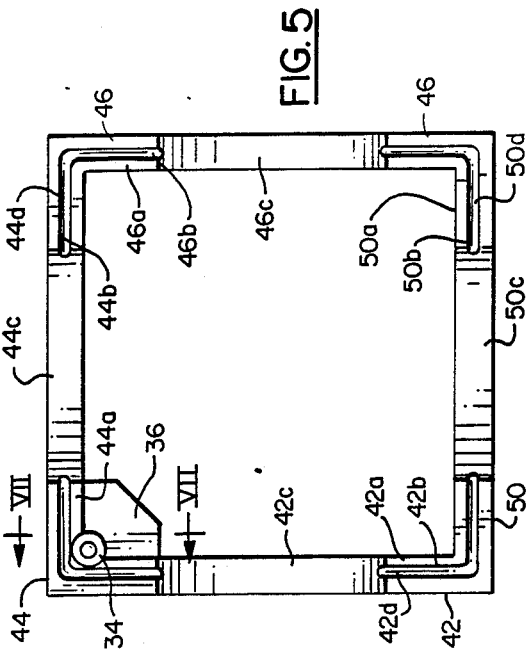
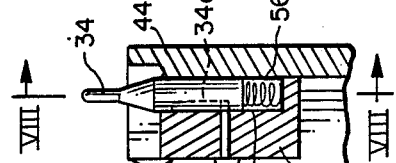
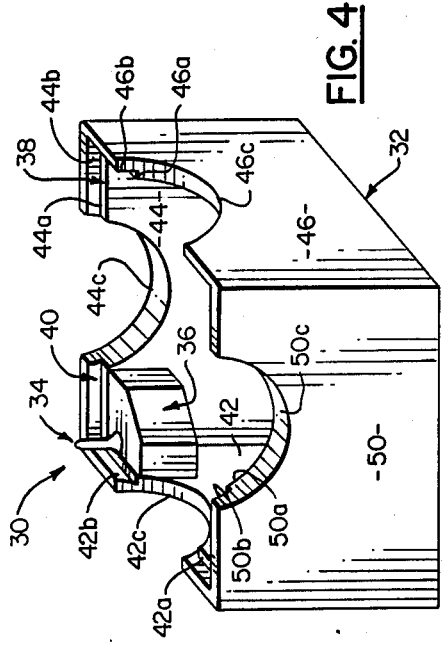
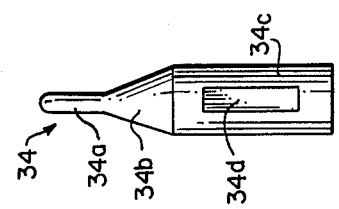

APPARATUS FOR OPENING AND HOLDING A FRAME AND A METHOD OF MOUNTING AN OPTICAL ELEMENT IN A FRAME

BACKGROUND OF THE INVENTION

This invention generally relates to a device for opening and holding a frame while an element such as a photographic plate or a holographic element, is placed in or removed from the frame.

Optical elements such as holographic recording mediums and matched filters made from those recording mediums, may be held in frames to facilitate moving and positioning the optical elements. For example, by holding a holographic element in a frame, that element may be moved and otherwise handled without requiring any direct contact against the holographic element itself, other than the contact between the holographic element and the frame. Also, the frame may be specifically shaped or constructed to fit in a device or mechanism used to move or to position the frame and holographic element. One frame that may be used to hold an optical element is described in detail in U.S. patent application No. 903,273, now U.S. Pat. No. 4,806,341.

Often photographic materials used to make holographic elements are placed in and removed from a frame either in the dark or in very low levels of light to minimize any undesirable exposure of the photographic materials. This often makes it difficult to open the frame and to place the photographic materials in and to remove those materials from the frame.

SUMMARY OF THE INVENTION

An object of this invention is to provide a simple and inexpensive device for opening and holding a frame while an optical element is placed in or removed from the frame.

Another object of the present invention is to provide a device and a method employing the device that are very simple to use in near or complete darkness to open a frame and to hold the frame open while an optical element is placed in or removed from the frame.

A further object of this invention is to provide a device that automatically flexes a frame into an open position as the frame is seated on the device, and that will allow the frame to flex automatically into a closed position as the frame is removed from the device.

These and other objectives are attained with apparatus for opening and holding a frame of the type that is flexible between open and closed positions and that forms an opening. The apparatus comprises a mounting member defining a seating surface adapted to seat against the frame; and an expansion member connected to the mounting member, and adapted to extend into the opening of the frame to force the frame into its open position, and to hold the frame in that open position when the frame is seated on the mounting member. Preferably, the apparatus for opening and holding the frame further comprises a retaining member that connects the expansion member to the mounting member and which supports the expansion member for movement between retracted and extended positions. In this extended position, the expansion member is adapted to hold the frame on the mounting member in a secure pressure engagement therewith; while when the expansion member is in the retracted position, the frame is released from that secure pressure engagement to facilitate removing the frame from the mounting member.

In use, the frame is placed on the mounting member, the expansion member is forced through the opening in the frame to spread the frame from its closed position to its open position, and an optical element is placed in or removed from the frame. Once this is done, the expansion member is withdrawn from the opening in the frame to return the frame to its closed position, and then the frame is removed from the mounting member.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4 is a perspective view of a frame opening and holding device of this invention.

FIG. 5 is a top view of the device of FIG. 4.

FIG. 6 is a side view of the expansion member of the frame opening and holding device.

FIG. 7 is a cross-sectional view of an upper corner of the frame opening and holding device, taken along line VII—VII of FIG. 5.

FIG. 8 is a cross-sectional view taken along line VIII—VIII of FIG. 7.

DETAILED DESCRIPTION OF THE PREFERRED EMBODIMENTS

Figure 1:
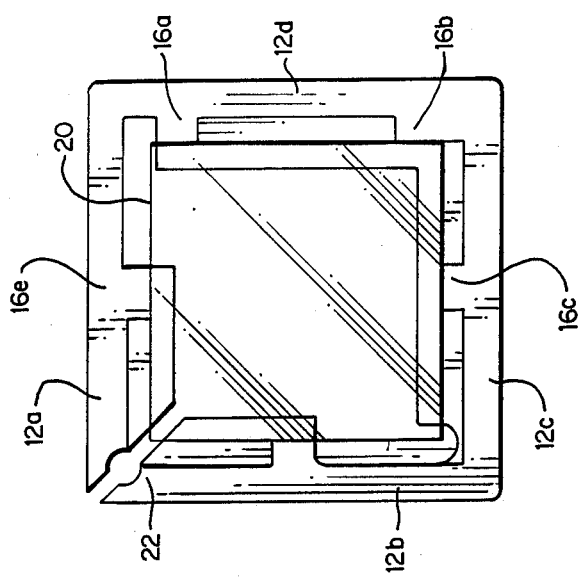
FIG. 1 is a perspective view of a frame that may be used with the present invention, and showing the frame in a closed position.
Figure 2:
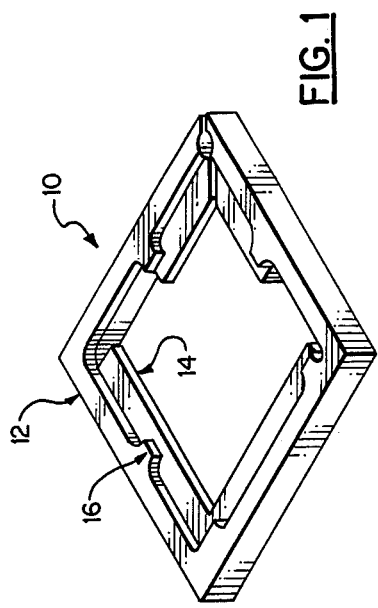
FIG. 2 is a plan view of the frame of FIG. 1, but with the frame in an open position.
Figure 3:
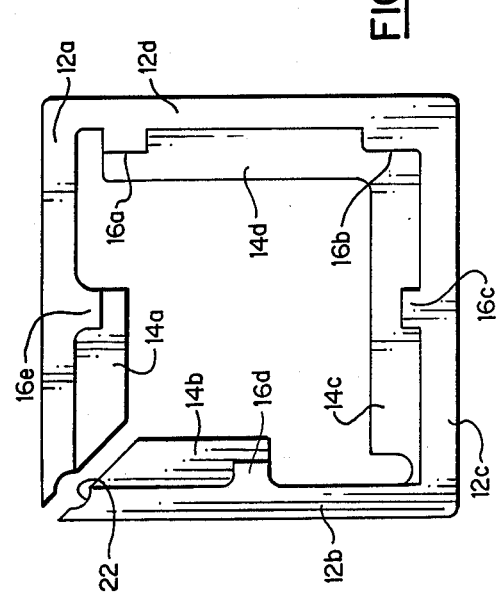
FIG. 3 also is a plan view of the frame, but with the frame in a closed position and with an optical element held inside the frame.

FIGS. 1-3 illustrate a frame 10 generally comprising border portion 12, a seating portion 14, and a plurality of lateral positioning tabs 16. Border portion 12 includes legs 12a, 12b, 12c and 12d; seating portion 14 includes a plurality of flat, coplanar surfaces 14a, 14b, 14c and 14d; and lateral positioning tabs 16 includes reference tabs 16a, 16b and 16c and pressure tabs 16d and 16e.

Border portion 12 forms the outside border or perimeter of frame 10, and is flexible between a closed position, shown in FIGS. 1 and 3, and an open position, shown in FIG. 2. In the open position, an optical element such as a photographic plate or holographic element 20 (shown in FIG. 3), may be inserted into and removed from frame 10, and in the closed position, that element is securely held inside the frame. Border portion 12 is biased, for example by its inherent resiliency, toward the closed position to hold element 20 against lateral positioning tabs 16a, 16b and 16c in a fixed position in, and with a preset angular orientation relative to, frame 10. Legs 12a and 12b are split apart to allow border portion 12 to flex between its open and closed positions, and moreover, opposing edges of legs 12a and 12b form an opening 22 that is used to force the border portion into its open position, as discussed below.

As shown in FIGS. 1-3, border portion 12 has a flat, square shape, with all four legs 12a, 12b, 12c and 12d having substantially the same length. Border portion 12 may, though, have shapes and sizes other than as shown in FIGS. 1-3, and the preferred shape of the border portion generally matches the shape of the optical element with which frame 10 is used. For example, the border portion may have a rectangular shape that is not also a square.

FIGS. 4 and 5 show device 30 to open frame 10 and to hold that frame in its open position as an optical element is placed in or removed from the frame. Generally, device 30 includes mounting member 32 and expansion member or plunger 34, and preferably device 30 further includes retaining member 36, which connects the expansion member to the mounting member. Generally, mounting member 32 defines seating surface 38 that is adapted to seat against the frame 10; and expansion member 34 is connected to mounting member 32 and is adapted to extend into opening 22 of frame 10 to force the frame into the open position, and to hold the frame in the open position when the frame is seated on the mounting member. Preferably, expansion member 34 is supported by retaining member 36 for movement between retracted and extended positions. In this extended position, expansion member 34 is adapted to hold frame 10 on mounting member 32 in a secure pressure engagement therewith; while when expansion member 34 is in the retracted position, frame 10 is released from that secure pressure engagement to facilitate removing the frame from the mounting member.

More specifically, with the embodiment of device 30 shown in the drawings, mounting member 32 defines a top recess 40 for receiving frame 10, and seating surface 38 is located at the bottom of this top recess. Mounting member 32 includes a multitude of side wall members 42, 44, 46 and 50, and each of the side wall members includes a flat inside shoulder and an upper inside surface, referred to as a banking surface, extending upward from this inside shoulder. In the drawings, the inside shoulder of each wall member is identified by the same number as the wall member but with the added suffix "a", and the banking surface of each wall member is also identified by the same number as the wall member but with the added suffix "b". The inside shoulders 42a, 44a, 46a and 50a are coplanar and form seating surface 38. Upper surfaces 42b, 44b, 46b and 50b extend to a level above seating surface 38 and extend around top recess 40 to hold frame 10 therein.

Preferably, at least one of the side wall members forms a through opening or recess extending downward from a top edge of the side member to a level below seating surface 38 to facilitate removing frame 10 from mounting member 32, as discussed in greater detail below. More preferably, a through opening as described above is formed in each of a pair of opposite side wall members, and most preferably, each of the side wall members forms such a through opening. The through opening of each wall member is identified by the same number as the wall member but with the added suffix "c". With particular reference to FIG. 4, preferably, each of these through openings is located midway along the width of the side wall member in which the opening is formed, and the through opening has a generally semi-circular shape.

Mounting member 32 may have any suitable shape and size and may be designed for any size or shape frame. For example, as shown in FIGS. 4 and 5, mounting member 32 has a box shape with open top and bottom ends. In particular, side wall member 42 is parallel to member 46, while member 44 is parallel to member 50. Also, member 42 is connected to and is perpendicular to members 44 and 50, and member 46 is connected to and is perpendicular to members 44 and 50. Preferably, members 42, 44, 46 and 50 have the same height, the same width and the same depth and are otherwise generally identical. Mounting member 32 may be made in any suitable way and from any suitable material or materials, and preferably, all of the parts of the mounting member are integrally connected together. For example, mounting member 32 may be cut from a box beam of anodized aluminum, through openings 42c, 44c, 46c and 50c may be formed by cutting out portions of side wall members 42, 44, 46 and 50, and the mounting member may then be machined to form shoulders 42a, 44a, 46a and 50a.

With particular reference to FIG. 6, expansion member 34 preferably includes top portion 34a, intermediate portion 34b and bottom portion 34c. Top portion 34a is adapted to fit into opening 22 in frame 10 and to help guide the frame onto expansion member 34 and mounting member 32. Intermediate portion 34b extends downwardly outwardly from top portion 34a and is provided to spread frame 10 from its closed position to its open position as the frame is seated on mounting member 32, and to hold the frame in its open position when the frame is seated against the mounting member. Bottom portion 34c extends downward from intermediate portion 34b and is provided to hold the expansion member in device 30.

Preferably, top portion 34a has an elongated tubular shape, intermediate portion 34b has a frusto-conical shape, and bottom portion 34c has a cylindrical shape. Top portion 34a and the top end of frusto-conical portion 34b are small enough to fit into opening 22 when frame 10 is in its closed position; and in use, top and intermediate portions 34a and 34b of the expansion member are inserted into and through opening 22 so that the frusto-conical portion of the expansion member engages edges of that opening and pushes those edges away from each other, spreading frame 10 from its closed position to its open position. Preferably, frusto-conical portion 34b is large enough so that it will force frame 10 open to the desired size, but small enough so that it does not break or crack the frame and so that it allows the frame to fit into top recess 40 in contact with or immediately above seating surface 38.

When frame 10 is seated on mounting member 32, the frictional contact between intermediate portion 34b and the edges of opening 22 holds expansion member 34 in place within that opening, holding frame 10 in its open position. With frame 10 held in its open position, it is comparatively easy for an individual to place an optical element 20 in the frame or to remove an optical element therefrom. As frame 10 is so mounted on expansion member 34, the outside surfaces of the frame are forced outward slightly, and preferably these surfaces of the frame are forced into a secure pressure fit against mounting member 32, specifically upper surfaces 42b, 44b, 46b, and 50b of the side wall members. This pressure fit helps to hold frame 10 in a fixed position relative to the mounting member.

The specific location of expansion member 34 on device 30 is selected to facilitate aligning opening 22 of frame 10 with the expansion member, and the expansion member may be connected to the mounting member in any suitable manner. Preferably, as mentioned above, expansion member 34 is connected to mounting member 32 via retaining member 36. With particular reference to FIGS. 4, 7 and 8, retainer member 36 comprises body 52, which forms an elongated recess 54; and expansion member 34, specifically bottom portion 34c, is slidably disposed in recess 54 for reciprocating upward and downward movement between the above-mentioned extended and retracted positions of the expansion member, which are shown in FIGS. 7 and 8 respectively. With the embodiment of device 30 shown in the drawings, recess 54 is located along one side of body 52 of retaining member 36, immediately adjacent mounting member 32 so that the retaining member and the mounting member form a socket in which expansion member 34 is disposed.

Retaining member 36 is preferably provided with means urging expansion member 34 to its extended position; and this urging means may comprise a spring 56 located in recess 54, between the bottom of that recess and the bottom of the expansion member.

Retaining member 36 is preferably also provided with means limiting movement of expansion member 34 at its extended position. More specifically, an elongated groove 34d extends inward from the outside surface of expansion member 34, and means such as screw 60 is mounted on retainer body 52 and extends into groove 34d. Screw 60 is located so that, as expansion member 34 moved upward and reaches its extended position, screw 60 engages the surface of the expansion member that forms the lower end of groove 34d, preventing further upward movement of the expansion member. Preferably, screw 60 is threadably connected to retainer body 52 and may be threaded away from expansion member 34, out of groove 34d and recess 54, to allow the expansion member and spring 56 to be removed from recess 54 and replaced.

It should be noted that expansion member 34 may be connected to mounting member 32 by means other than retaining member 36. For example, with reference to FIG. 9, expansion member 34 may be releasably held in a fixed position in or adjacent a corner of mounting member 32 by a set or tap screw 62 that extends through the expansion member and into the mounting member.

Figure 10:
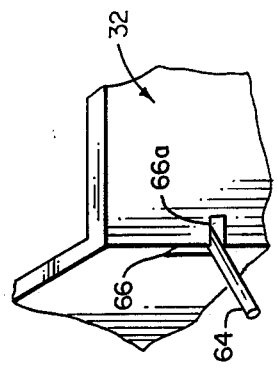
FIG. 10 is a perspective view of a portion of another alternate frame opening and holding device, in which a handle is provided to move the expansion member.

With reference to FIG. 10, expansion member 34 may be provided with a handle 64 to help move the expansion member and to hold it in various locations. This handle 64 may comprise a pin or rod that is connected to bottom portion 34c of the expansion member and that extends therefrom through a guide slot 66 formed in mounting member 32 to the exterior thereof. With this arrangement, expansion member 34 may be moved between its retracted and extended positions by sliding the handle 64 upward and downward along this guide slot 66. This guide slot may include a primary vertical portion, and one or more horizontal portions 66a extending outward from the vertical portion, and the handle 64 may be moved into one of these horizontal portions to hold expansion member at a selected position.

Expansion member 34 and retaining member 36 may be made in any suitable way and from any suitable materials. For example, members 34 and retainer body 52 may be made from a suitable plastic such as lexon, polymethol or methacrylate, and these parts may be made by injection molding processes. Retainer body 52 may be connected to mounting member 32 in any acceptable manner, and for instance, the retainer body may be held in place by a plurality of screws (not shown) extending through the retainer body and into the mounting member.

Figure 12:
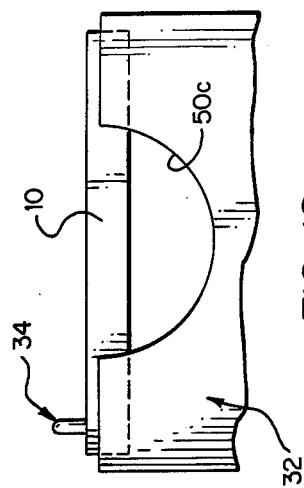
FIG. 12 is a side view of a portion of the frame opening and holding device with the frame of FIGS. 1-3 seated thereon.
Figure 11:
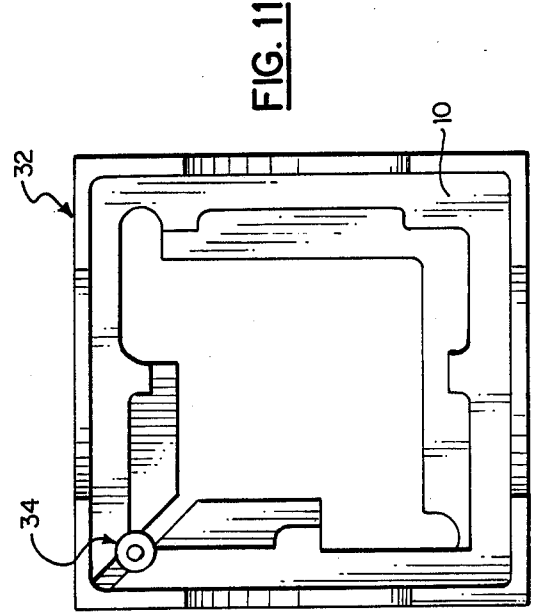
FIG. 11 is similar to FIG. 5, but with the frame of FIGS. 1-3 seated on the frame opening and holding device of FIGS. 4 and 5.

With reference to FIGS. 11 and 12, in operation, generally, frame 10 is placed on mounting member 32, expansion member 34 is forced through opening 22 in the frame 10 to spread the frame from its closed position to its open position, and optical plate 20 (shown in FIG. 3) is placed in the frame. Once this is done, expansion member 34 is withdrawn from opening 22 to return frame 10 to its closed position, and the frame is removed from the mounting member.

More specifically, prior to placing frame 10 on mounting member 32, opening 22 is aligned with expansion member 34, and the outside perimeter of the frame is generally aligned with the inside surfaces 42b, 44b, 46b and 50b, and frame 10 is placed on mounting member 32 by placing the frame in recess 40 and seating the frame against seating surface 38. With the preferred embodiment of device 30 illustrated in FIGS. 4, 5, 7 and 8 the force of spring 56 is sufficient to force expansion member 34 through opening 22 as frame 10 is placed on mounting member 32, and the frame is simultaneously forced into a secure pressure engagement with the mounting member, specifically upper surfaces 42b, 44b, 46b and 50b, wherein the mounting member holds the frame in a fixed position. Frame 10 is released from this pressure engagement by pushing expansion member 34 downward toward or into its retracted position, breaking the contact between the frame and intermediate portion 34b of the expansion member. An individual may then remove frame 10 from the mounting member by using his or her hand to grab the sides of the frame through openings 42c, 44c, 46c and 50c, extending the tips of one or more fingers through those openings and underneath the frame, and then simply pulling the frame away from mounting member 32.

Figure 9:
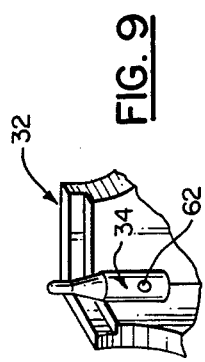
FIG. 9 is a perspective view of a portion of an alternate frame opening and holding device in which the expansion member is held in a fixed position.

With the alternate embodiment illustrated in FIG. 9, in which expansion member 34 is held in a fixed position relative to mounting member 32, frame 10 would be released from the pressure engagement with mounting member 32 and the expansion member is withdrawn from opening 22 in the frame as the frame is removed from the mounting member.

Once an optical element is placed in frame 10, it may be desirable to glue that element to the frame, and this can conveniently be done while the frame is mounted on device 30. To help prevent frame 10 itself from being accidentally glued to device 30, one or more of side walls 42, 44, 46 and 50 may be provided with a longitudinal groove extending downward from the inside shoulder of the side wall member, between that inside shoulder and the upper flange of the side wall member. These longitudinal grooves are shown in FIG. 5, and the longitudinal groove of each wall member is identified by the same number as the wall member but with the added suffix "d". As shown in FIG. 5, the longitudinal groove of each side wall member extends from positions adjacent the lateral ends of the side wall member to the through opening therein.

While is is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. Apparatus for opening and holding a frame of the type that is flexible between open and closed positions and that forms an opening, the apparatus comprising:
    a mounting member defining a seating surface adapted to seat against the frame; and
    an expansion member connected to the mounting member, and adapted to extend into the opening of the frame to force the frame into the open position, and to hold the frame in the open position when the frame is seated on the mounting member.

2. Apparatus according to claim 1, wherein the mounting member includes a plurality of side members, at least one of the side members having a top edge and forming a through opening extending downward from said top edge to a level below said seating surface to facilitate removing the frame from the mounting member.

3. Apparatus according to claim 1, wherein the mounting member includes a multitude of side members, each of at least first and second of the side members having a top edge and forming a through opening extending downward from the top edge of the side member to a level below said seating surface to facilitate removing the frame from the mounting member.

4. Apparatus according to claim 1, further comprising a retaining member connecting the expansion member to the mounting member and movably supporting the expansion member for movement between retracted and extended positions, and wherein
    when the expansion member is in the extended position, the expansion member is adapted to hold the frame on the mounting member in a secure pressure engagement therewith; and
    when the expansion member is in the retracted position, the frame is released from said secure pressure engagement to facilitate removing the frame from the mounting member.

5. Apparatus according to claim 4, wherein:
    the retaining member includes a body defining an elongated socket; and
    the expansion member is supported in said socket for movement between the retracted and extended positions.

6. Apparatus according to claim 5, wherein the retaining member further includes means urging the expansion member into the extended position.

7. Apparatus according to claim 6, wherein the urging means comprises a spring disposed in the elongated socket, the spring engaging the expansion member and urging the expansion member to the extended position.

8. Apparatus according to claim 6, wherein the retaining member further includes means limiting movement of the expansion member at the extended position.

9. Apparatus according to claim 8, wherein:
    the expansion member includes an outside surface, and forms a slot extending inward from said outside surface; and
    the means limiting movement of the expansion member includes a pin connected to the body of the retaining member and extending into said slot.

10. Apparatus according to claim 1, wherein:
    the mounting member defines a top recess for receiving the frame; and
    the seating surface is located at a bottom of said top recess.

11. Apparatus according to claim 10, wherein:
    the mounting member includes a multitude of side wall members; and
    each side wall member includes
        (i) a flat, inside shoulder, and
        (ii) an upper inside surface extending to a level above the seating surface;
    the inside shoulders of the side wall members are coplanar and form the seating surface; and
    said upper inside surfaces of the side wall members extend around the top recess of the mounting member to hold the frame in said recess.

12. Apparatus according to claim 1, wherein:
    the mounting member defines a top recess for receiving the frame;
    the seating surface is located at a bottom of said top recess; and
    the top recess forms a generally unrestricted path extending directly upward from the seating surface, and wherein the frame is movable away from the seating surface solely by lifting the frame upward, away from said seating surface.

13. A method of mounting an optical element in a frame, wherein the frame is flexible between open and closed positions and forms an opening, and for use with a device including an expansion member adapted to fit into said opening, the method comprising the steps of:
    placing the frame on the device;
    forcing the expansion member through the opening in the frame to spread the frame from the closed position to the open position;
    placing the optical element in the frame;
    withdrawing the expansion member from the opening in the frame to return the frame to the closed position with the optical element secured within the frame; and
    removing the frame from the device.

14. A method according to claim 13, wherein the expansion member is movable between extended and retracted positions, and wherein the withdrawing step includes the step of moving the expansion member from the extended position to the retracted position to withdraw the expansion member from said opening in the frame.

15. A method according to claim 14, wherein the forcing step includes the step of forcing the expansion member through the opening in the frame as the frame is placed on the device.

16. A method according to claim 13, further including the step of securing the frame in a fixed position on the device.

17. A method according to claim 13, wherein the withdrawing and removing steps occur simultaneously.

18. A method according to claim 13, wherein the device includes an upper recess, and wherein:
    the step of placing the frame on the device includes the step of locating the frame in said upper recess with the expansion member extending into the opening; and
    the forcing step includes the steps of forcing the expansion member through the opening to force the frame into a secure pressure engagement with the device.

19. A method according to claim 13, wherein the expansion member is withdrawn from the opening in the frame prior to removing the frame from the device.

20. A method according to claim 12, wherein the removing step includes the step of removing the frame from the device with the optical element secured in the frame.

21. A method according to claim 12, wherein the device includes a top recess for receiving the frame and a seating surface located at a bottom of the top recess, and wherein:
- the step of placing the frame on the device includes the step of seating the frame against the seating surface; and
- the step of removing the frame includes the step of moving the frame away from the seating surface solely by means of lifting the frame upward through the top recess.

* * * * *

UNITED STATES PATENT AND TRADEMARK OFFICE
CERTIFICATE OF CORRECTION

PATENT NO. : 4,929,056

DATED : May 29, 1990

INVENTOR(S) : Kenneth G. Leib, et al.

It is certified that error appears in the above-identified patent and that said Letters Patent is hereby corrected as shown below:

Column 8, line 65, claim 18: "steps" should read as
--step--

Signed and Sealed this

Third Day of December, 1991

Attest:

HARRY F. MANBECK, JR.

*Attesting Officer*  *Commissioner of Patents and Trademarks*